Dec. 22, 1925.
J. KEYMS
1,566,481
EYE PROTECTING SCREEN FOR PERSONAL WEAR
Filed Oct. 22, 1924
2 Sheets-Sheet 1
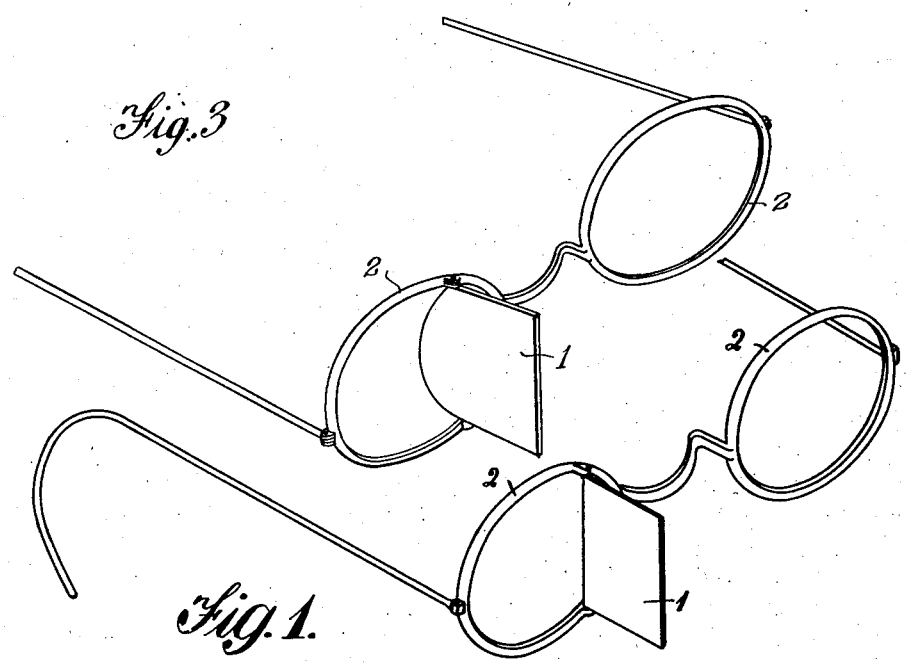
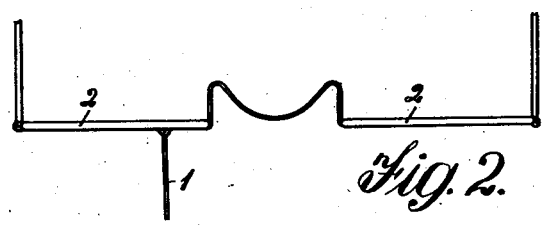
INVENTOR
Joshua Keyms,
by Arthur J. Ciephuns
Attorney.

Dec. 22, 1925.  1,566,481
J. KEYMS
EYE PROTECTING SCREEN FOR PERSONAL WEAR
Filed Oct. 22, 1924   2 Sheets-Sheet 2

INVENTOR
Joshua Keyms
by Arthur D. Carhune
Attorney.

Patented Dec. 22, 1925.

1,566,481

UNITED STATES PATENT OFFICE.

JOSHUA KEYMS, OF SOUTHAMPTON, ENGLAND.

EYE-PROTECTING SCREEN FOR PERSONAL WEAR.

Application filed October 22, 1924. Serial No. 745,249.

*To all whom it may concern:*

Be it known that I, JOSHUA KEYMS, a subject of the King of Great Britain and Ireland, residing at Carrig-A-Phooka, 58, the Avenue, Southampton, England, have invented new and useful Improvements in and Relating to Eye-Protecting Screens for Personal Wear, on which Letters Patent have been granted in Great Britain under No. 213,851, dated 30th October, 1923, of which the following is a specification.

The present invention relates to an eye screen worn to protect the eyes of the user from being dazzled on approaching, or being approached, by a bright light such as a motor-car headlight.

Briefly stated the present invention comprises a spectacle, goggle or like frame, provided with one or more vertical screens attached to the eye piece or eye pieces intermediate between the centre and the left-hand corner or corners of said eye piece or eye pieces. so that they project forward in such a position as to lie close up to the pupil of the eye when the spectacle is worn by the user. The screens may be flat or curved, and two may be used, one for each eye simultaneously; or one may be provided for each eye singly. Being substantially parallel with the axis of vision, the screens will not interfere with the sight of the user, or do so to a negligible extent only.

My invention is shown by way of example in the accompanying drawings, in which—

Figure 1 shows a perspective view of a spectacle frame provided with a single screen.

Figure 2 shows a plan view of Figure 1.

Figure 3 shows a perspective view of a spectacle frame provided with an alternative form of screen.

Figure 4:
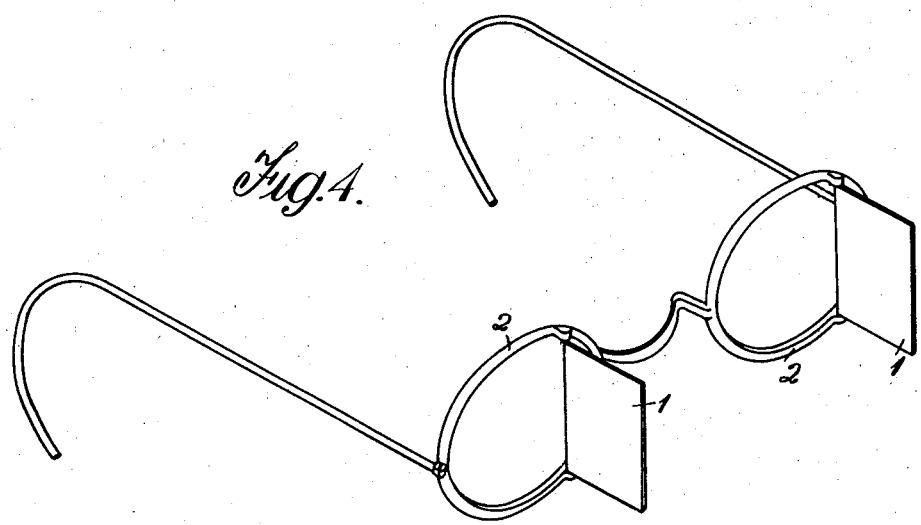
Figure 4 shows a perspective view of a spectacle frame provided with a pair of screens.

In the drawings, a screen 1 is attached vertically to the spectacle frame 2 so that it is substantially parallel with the normal axis of vision. As shown the screen is placed somewhat to the left-hand side of the centre of the eyepiece (or pupil). Since approaching vehicles are somewhat to the left-hand side of the user, the screen will thus shade his eye from light rays approaching from this side of the road. For the same reason, if only one screen is used as shown, it is fitted for the right eye, although a much larger screen on the left eye would protect both.

To protect the eye from very oblique rays, the shade may be continued backwards behind the supporting points as shown in Figure 3, by this means bringing the rear end of the shade closer to the eye; or the open portion of the frame included between the hinge and the corner nearest to it (for instance, the nasal corner in the right eye) can be completely occluded.

In Figure 4 I show a frame in which a screen is provided for each eye.

Figures 5, 7:
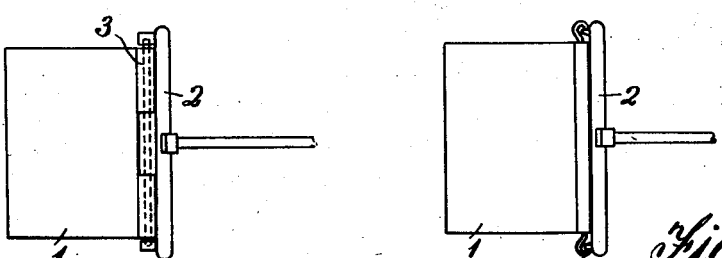
Figure 5 shows a detail side view of a screen hinged to the frame.
Figure 7 shows a detail side view of a screen attached to the frame by spring clips.
Figure 6:
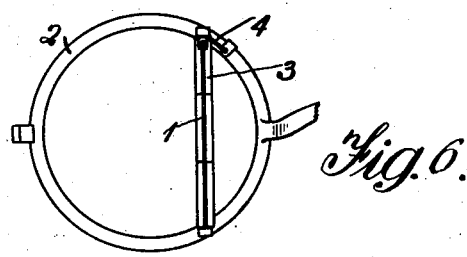
Figure 6 shows a front view of Figure 4.

Alternatively, to the method of fitting the shades described and illustrated in Figures 1, 2. 3 and 4, a method I may employ is to fix the shade by a hinge 3 to a short vertical bar brazed into the spectacle frame, as shown in Figures 5 and 6, the bar acting as a pivot. A small spring 4 keeps the shade in position. This arrangement allows of the screen being folded back and the spectacle or goggle placed in a case when not in use. For use with the wearer's own spectacles, this supporting bar can be secured as shown in Figure 7 to the rims of the spectacles by means of suitable spring clips 5.

The screen may be made of opaque, translucent or partially transparent material, and has preferably a dull surface so that the wearer is not troubled by reflection from the surface of the screen.

What I claim is:—

1. An anti-dazzle device for personal use, comprising a frame, right and left eye pieces in said frame, a vertical bar mounted on an eye piece in its vertical plane and intermediate between its centre and its left hand extremity, a vertical screen hinged to said vertical bar so as to lie in a plane parallel with the axis of vision when the frame is in use.

2. An anti-dazzle device for personal use, comprising a frame, right and left eye pieces in said frame, a vertical bar mounted on said right eye piece in its vertical plane and intermediate between its centre and its left hand extremity, a vertical screen hinged to said vertical bar so as to lie in a plane parallel with the axis of vision when the frame is in use, and a spring mounted on said right eye piece adapted to hold said screen in position.

In witness whereof I have signed my name to this specification.

JOSHUA KEYMS, M. D.